(12) United States Patent
Kurihara (10) Patent No.: US 8,995,773 B2
(45) Date of Patent: Mar. 31, 2015

(54) IMAGE MEASUREMENT APPARATUS AND METHOD OF MEASURING WORKS USING EDGE DETECTION TOOLS

(75) Inventor: Masaki Kurihara, Yokohama (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 13/548,588

(22) Filed: Jul. 13, 2012

(65) Prior Publication Data
US 2013/0039585 A1 Feb. 14, 2013

(30) Foreign Application Priority Data

Aug. 11, 2011 (JP) ................................ 2011-175755

(51) Int. Cl.
| | | |
|---|---|---|
| G06K 9/00 | (2006.01) | |
| G06K 9/48 | (2006.01) | |
| G06T 7/00 | (2006.01) | |
| G06T 7/60 | (2006.01) | |
| G01B 11/00 | (2006.01) | |

(52) U.S. Cl.
CPC ............... *G06T 7/0083* (2013.01); *G06T 7/602* (2013.01); *G01B 11/005* (2013.01); *G06T 2207/20016* (2013.01); *G06T 2207/20061* (2013.01); *G06T 2207/20092* (2013.01); *G06T 2207/30108* (2013.01)
USPC ............................ 382/199; 382/141; 382/152

(58) Field of Classification Search
CPC ................... G06T 7/0085; G06T 2207/20092; G06T 2207/20096; G06T 2207/30164; G06T 2207/30141; G06T 2207/30148; G06T 2207/2006; G01B 11/005
See application file for complete search history.

(56) References Cited

U.S. PATENT DOCUMENTS

| | | | |
|---|---|---|---|
| 5,629,989 A | 5/1997 | Osada | |
| 2006/0093205 A1* | 5/2006 | Bryll et al. | 382/152 |
| 2008/0101682 A1* | 5/2008 | Blanford et al. | 382/141 |
| 2011/0161876 A1* | 6/2011 | Chang et al. | 715/810 |
| 2011/0221894 A1* | 9/2011 | Kurihara et al. | 348/142 |

FOREIGN PATENT DOCUMENTS

| | | |
|---|---|---|
| CN | 1277385 | 12/2000 |
| CN | 1782661 | 6/2006 |

(Continued)

OTHER PUBLICATIONS

Mitutoyo, "QVPAK—3D CNC Vision Measuring Machine—User's guide Version 7", Internet Citation, 2003, XP007903535, URL:http://www2.mitutoyo.de, retrieved by European Patent Office on Nov. 19, 2007.

(Continued)

*Primary Examiner* — Stephen R Koziol
*Assistant Examiner* — Timothy Choi
(74) *Attorney, Agent, or Firm* — Greenblum & Bernstein, P.L.C.

(57) ABSTRACT

An image measurement apparatus includes: an imager section, an obtainment section, an outline detection section, a setting section, and a measurement section. The imager section takes an image of a subject to be measured. The obtainment section obtains a taken image of the subject taken by the imager section. The outline detection section detects, by a Hough transformation, outline of a graphic included in the image obtained by the obtainment section. The setting section sets an edge detection tool on the outline detected by the outline detection section. The measurement section measures, by the edge detection tool set by the setting section, graphic information concerning the graphic.

11 Claims, 9 Drawing Sheets

(56) References Cited

FOREIGN PATENT DOCUMENTS

| CN | 101131728 | 2/2008 |
|----|-----------|--------|
| CN | 101625723 | 1/2010 |
| DE | 69820921  | 10/2004 |
| EP | 1653408   | 5/2006 |
| JP | 8-247719  | 9/1996 |

OTHER PUBLICATIONS

Search report from E.P.O., mail date is Jan. 25, 2013.
China Office action, dated Sep. 23, 2014.

\* cited by examiner

IMAGE MEASUREMENT APPARATUS AND METHOD OF MEASURING WORKS USING EDGE DETECTION TOOLS

BACKGROUND OF THE INVENTION

1. Field of the Invention

The present invention relates to an image measurement apparatus and an image measurement method.

2. Description of Related Art

Heretofore, there is known an image measurement apparatus that takes an image of a measurement spot of a work by a charge coupled device (CCD) camera or the like and performs edge detection or the like to the taken image (see, Japanese Patent Application Laid-Open Publication No. 08-247719, for example).

The edge detection is, for example, a technique for obtaining edge information (e.g. positional coordinates) of a subject graphic to be measured included in the taken image and measuring graphical information such as a position or a width of the subject graphic, according to an edge detection tool that is set by a user within the taken image.

Figure 14A:
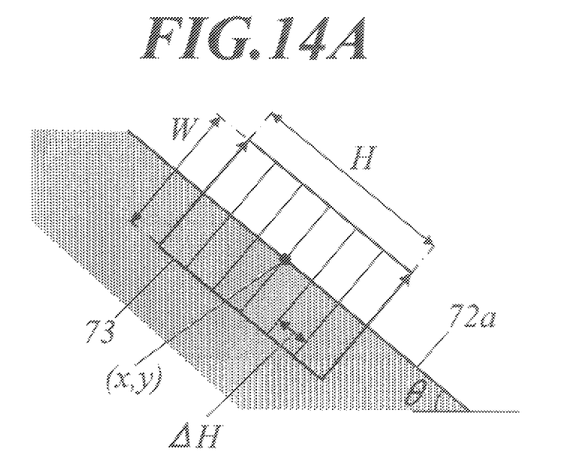
FIG. 14A is a view for explaining the edge detection tool.
Figure 14B:
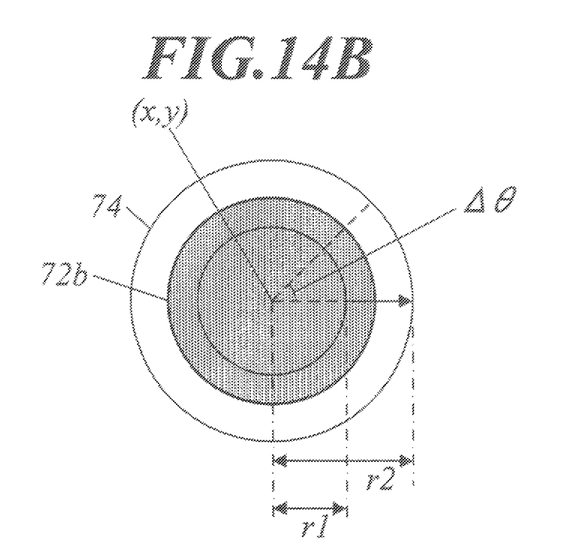
FIG. 14B is a view for explaining the edge detection tool.

As the edge detection tool, for example, a rectangular tool (referred to as a box tool, hereinafter) 73 shown in FIG. 14A and an annular-shaped tool (referred to as a circular tool, hereinafter) 74 shown in FIG. 14B are well-known.

The box tool 73 is better suited for edge detection of a linear portion 72a in the image and is defined by a position coordinate (X, Y) of a midpoint of the box tool 73, a distance W between both ends of the box tool 73 across the linear portion 72a, a width H of both sides of the box tool 73 in parallel with the linear portion 72a, and an angle θ.

In the case of the box tool 73, edge detection toward an arrowhead from a base thereof is repeatedly performed at an interval of ΔH which is preliminarily set within the width H.

The circular tool 74 is better suited for edge detection of a circular image 72b and is defined by a position coordinate (X, Y), an inside diameter r1 from which the detection starts, and an outside diameter r2 at which the detection ends.

In the case of the circular tool 74, edge detection toward an arrowhead from a base thereof is repeatedly performed with rotation centering on the coordinate (X, Y) at an interval of Δθ which is preliminarily set.

Moreover, there is known an image measurement apparatus provided with a function called "a step-and-repeat function" for continuously measuring the subject graphics to be measured, which graphics are equally spaced and regularly arranged, by setting a displacement amount of the edge detection tool and the number of measurements to be performed.

However, in such a conventional image measurement apparatus, a user by oneself has to manually set the edge detection tool within the taken image to execute the above-mentioned edge detection, thereby measuring the graphical information is troublesome.

Moreover, in the case of measuring the graphical information by using the step-and-repeat function, it is necessary to set the displacement amount of the edge detection tool that is set within the taken image and to set the number of measurements to be performed, thereby measuring the graphical information is further troublesome.

SUMMARY OF THE INVENTION

It is, therefore, a main object of the present invention to provide an image measurement apparatus and an image measurement method which are capable of swiftly and certainly performing a measurement of the graphical information of the image and reducing the user's operation.

According to a first aspect of the present invention, there is provided an image measurement apparatus, comprising: an imager section to take an image of a subject to be measured; an obtainment section to obtain a taken image of the subject taken by the imager section; an outline detection section to detect, by a Hough transformation, outline of a graphic included in the image obtained by the obtainment section; a setting section to set an edge detection tool on the outline detected by the outline detection section; and a measurement section to measure, by the edge detection tool set by the setting section, graphic information concerning the graphic.

Preferably, the image measurement apparatus further comprising a designation section to accept an input by a user to designate a form of the graphic, wherein the outline detection section detects an outline of the graphic having the same or similar form as the one designated by the designation section, from among the graphics included in the image obtained by the obtainment section.

According to a second aspect of the present invention, there is provided a method for measuring an image, comprising the steps of: obtaining an image of a subject to be measured taken by an imager section; detecting, by a Hough transformation, outline of a graphic included in the image obtained by the obtaining step; setting an edge detection tool on the outline detected by the detecting step; and measuring, by the edge detection tool set by the setting step, graphic information concerning the graphic.

Preferably, the method further comprising a designation step to accept an input by a user to designate a form of the graphic, wherein the detecting step detects an outline of the graphic having the same or similar form as designated by the designation step, from among the graphics included in the image obtained by the obtainment section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an image measurement apparatus according to an embodiment of the present invention will be described in detail with reference to the attached drawings.

An image measurement apparatus 100 is an apparatus which takes an image of a work 12 (a subject to be measured) disposed on a measurement table 13, processes image data of the taken image to detect an edge of a predetermined graphic within the taken image, and thereby measures graphical information such as a line width regarding the graphic.

Figure 1:
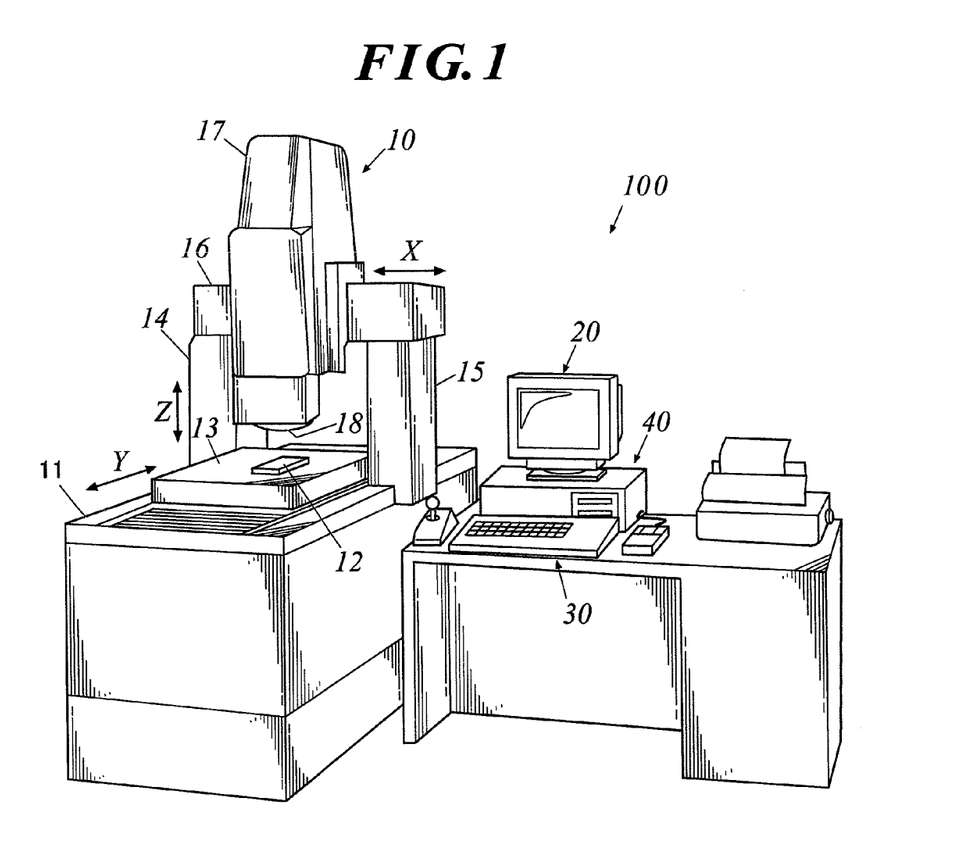
FIG. 1 is an external view showing a whole structure of an image measurement apparatus according to an embodiment of the present invention.
Figure 2:
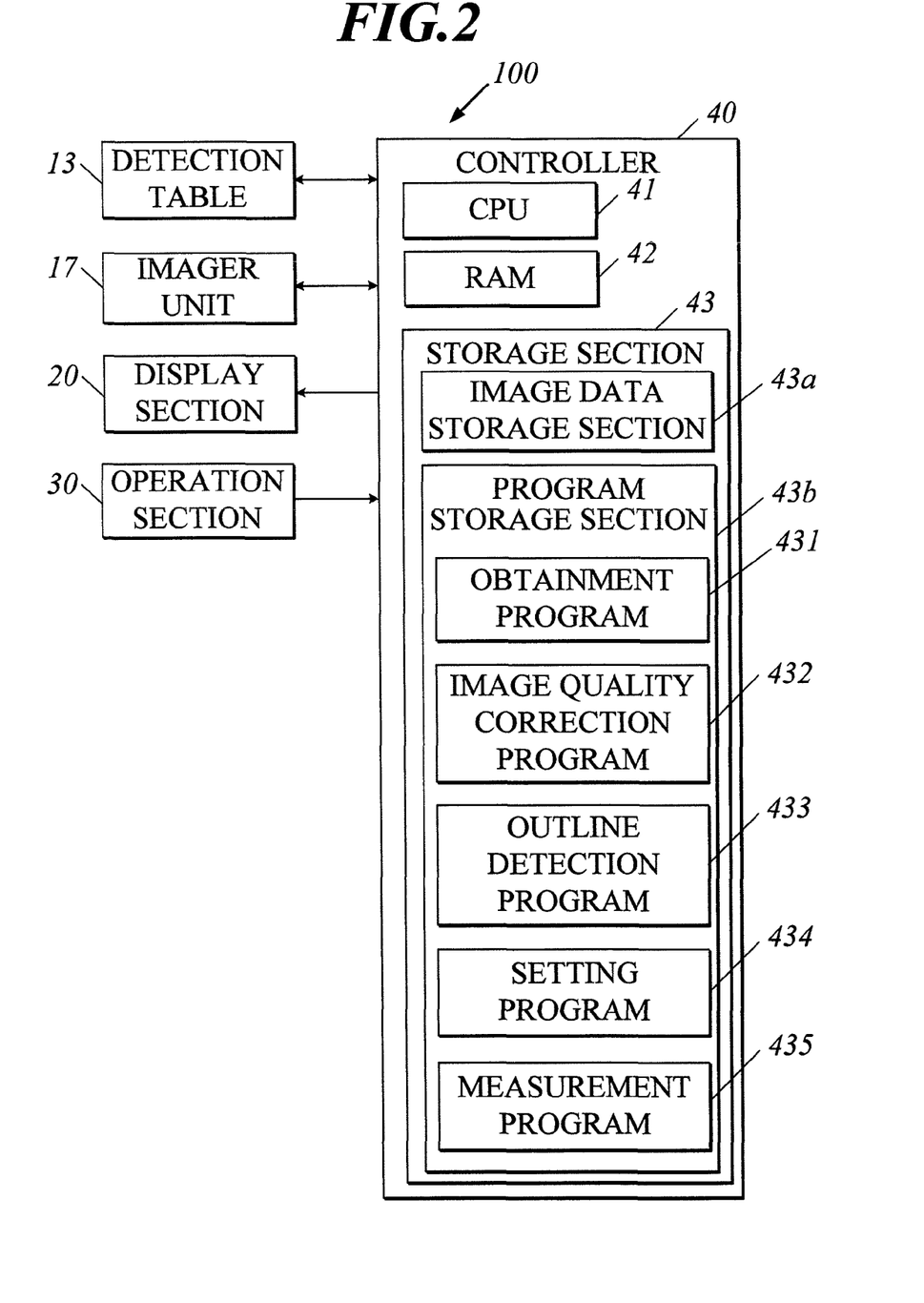
FIG. 2 is a block diagram showing a control structure of the image measurement apparatus of FIG. 1.

As shown in FIGS. 1 and 2, the image measurement apparatus 100 includes a body 10, a display section 20, an operation section 30, a controller 40, and the like.

The body 10 includes the measurement table 13 for disposing the work 12 thereon, an imager unit (imager section) 17 to take an image of the work 12, and the like.

The measurement table 13 is installed on a base 11 and is moved in a Y-axis direction by a non-illustrated Y-axis drive mechanism. Support arms 14 and 15 are fixed to the middle portions of both of upper side ends of the base 11, respectively, to extend upwardly from the middle portions. An X-axis guide 16 is fixed to both upper end portions of the support arms 14 and 15 to connect both the upper end portions. The imager unit 17 is supported by the X-axis guide 16.

The imager unit 17 is driven along the X-axis guide 16 by a non-illustrated X-axis drive mechanism. A CCD camera 18 is installed at lower end portion of the imager unit 17 so as to be opposed to the measurement table 13.

A Z-axis drive mechanism to move the CCD camera 18 in a Z-axis direction is installed in an inside of the imager unit 17, as well as a non-illustrated lighting system and a focusing mechanism.

The display section 20 includes, for example, a liquid crystal display panel and displays various images and setting screens in accordance with control signals input by the controller 40.

Specifically, the display section 20 displays, for example, an image (original image: see FIGS. 3 and 8) picked up and taken by the imager unit 17 and images (see, FIGS. 4-7 and FIGS. 9-12) that transit at each steps of an image measurement processing.

Here, the original image will be explained in detail.

The original image is a black-and-white grayscale image that includes one or more graphics.

The "graphic" is an area to be a subject to be measured in the original image and is formed in the shape of, for example, a straight line (see, FIG. 3) having a predetermined width, a circle (see, FIG. 8), or the like.

The graphic is an area darker or brighter in the original image, i.e., an area different from the other areas in brightness.

The operation section 30 includes, for example, operation keys such as a keyboard, a pointing device such as a mouse, and outputs operation signals associated with the operation by a user to the controller 40 in response to the operation.

The operation section 30 is used as a designation section in such a case that the user designates a form or shape of the graphic to which a measurement of the graphical information is performed among graphics in the original image.

Specifically, the user designates the shape of the graphic by designating "a straight line", "a circle", or the like through the operation section 30 while using the setting screen displayed on the display section 20.

When the user designates the shape of the graphic, graphics having the designated shape are selected from among the graphics existing in the original image. Then, edge detection is performed to the selected graphics and the measurement of the graphical information regarding the selected graphics is performed.

Accordingly, the user can arbitrarily designate a graphic to which the edge detection is to be performed. That is, if a plurality of graphics each having different shapes exists in the taken image, the user can measure only such graphical information of a graphic that has a desired shape by designating the shape of the graphic through the operation section 30.

Moreover, the operation section 30 is operated when an operation to instruct pickup of the work or an operation to instruct start of the image measurement processing is performed.

The controller 40 includes a central processing unit (CPU) 41, a random access memory (RAM) 42, a storage section 43, and the like, and is connected to the measurement table 13, the imager unit 17, the display section 20, the operation section 30, and the like, through a system bus or the like.

The CPU 41 performs, for example, various control processing in accordance with various processing programs for image measurement apparatus stored in the storage section 43.

The RAM 42 includes, for example, a program storage area for expanding processing programs to be executed by the CPU 41, a data storage area for storing input data or processing result generated when the processing programs are executed, or the like.

The storage section 43 stores, for example, a system program executable by the image measurement apparatus 100, various processing programs executable by the system program, data used when the various processing programs are executed, data of various processing results calculated by the CPU 41, and the like. Here, the programs are stored in the storage section 43 in the form of computer readable program code.

Specifically, the storage section 43 includes an image data storage section 43a for storing original image (black-and-white grayscale image) data, and a program storage section 43b for storing the programs.

The program storage section 43b stores, for example, an obtainment program 431, an image quality correction program 432, an outline detection program 433, a setting program 434, a measurement program 435, and the like.

The obtainment program 431 is a program for, for example, causing the CPU 41 to realize a function to obtain an image of the work 12 taken by the imager unit 17.

Specifically, when the user performs operation to instruct pickup of the work through the operation section 30 and the image of the work 12 is taken by the CCD camera 18 of the imager unit 17, the CPU 41 executes the obtainment program 431, obtains the original image (see FIGS. 3 and 8) as image data, and stores the image data in the image data storage section 43a.

The CPU 41 functions as an obtainment section by executing the obtainment program 431.

The image quality correction program 432 is a program for, for example, causing the CPU 41 to realize a function to correct image quality of the original image obtained by the execution of the obtainment program 431.

Figure 4:
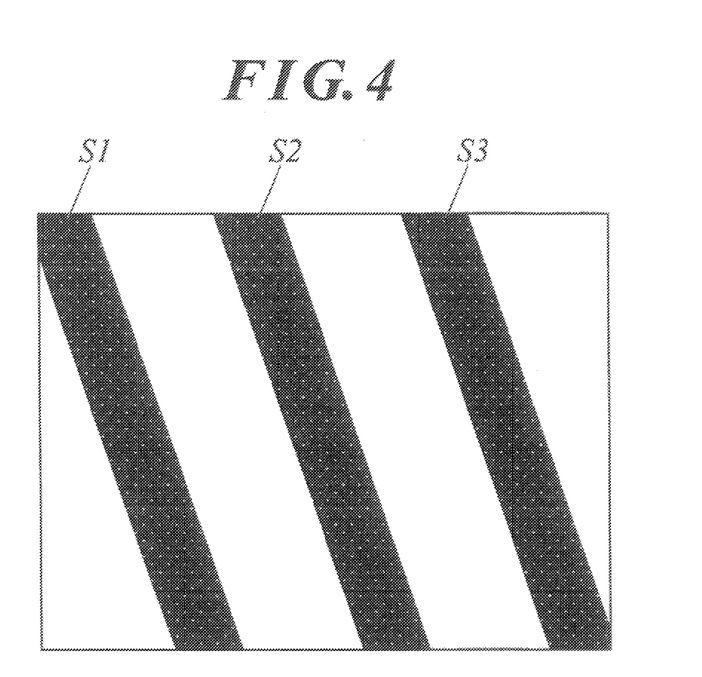
FIG. 4 shows an example of a corrected image obtained by correcting an image quality of the original image of FIG. 3.
Figure 9:
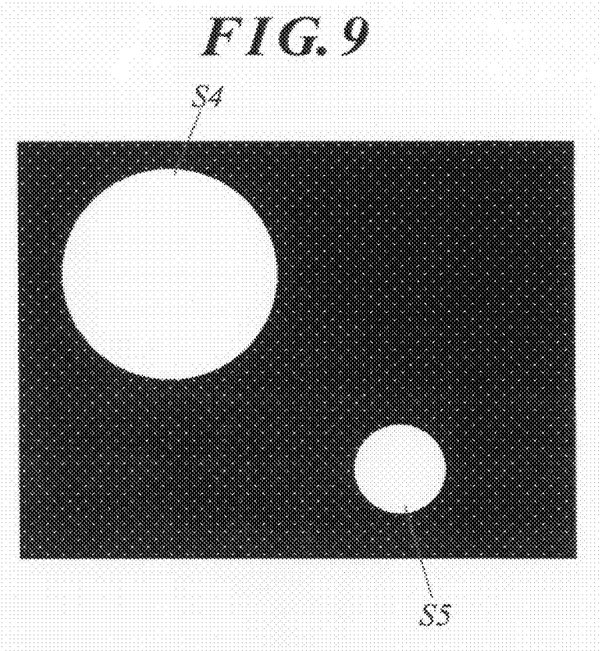
FIG. 9 shows an example of a corrected image obtained by correcting an image quality of the original image of FIG. 8.

Specifically, the CPU 41 executes, for example, binarization processing for converting image data of the original image which is a black-and-white grayscale image into image data having two gradations, namely, black and white, or noise removal processing for removing noises by using various image filters, when executing the image quality correction program 432 (see FIGS. 4 and 9).

As image quality correction processing, various well-known processing can be adopted besides the above mentioned binarization processing or the noise removal processing.

The CPU 41 functions as an image quality correction section by executing the image quality correction program 432.

The outline detection program 433 is a program for, for example, causing the CPU 41 to realize a function to detect outline of the graphic included in the corrected image in which image quality is corrected by the execution of the image quality correction program 432.

Figure 5:
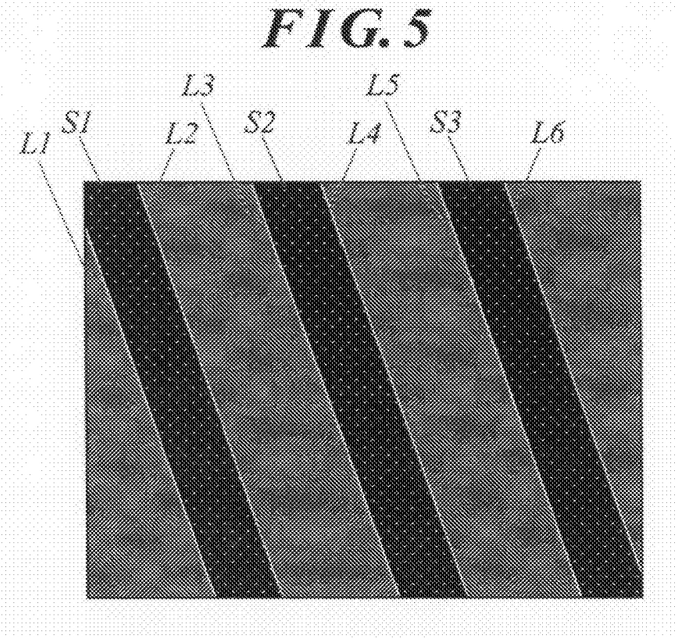
FIG. 5 shows an example of an image in which outlines are detected.
Figure 10:
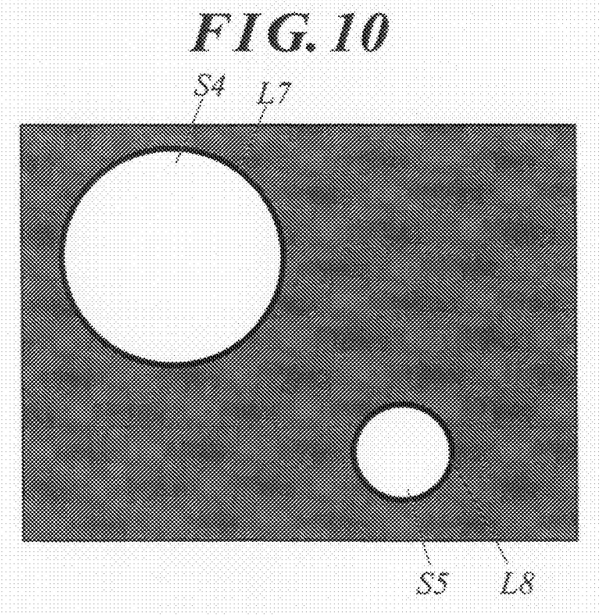
FIG. 10 shows an example of an image in which outlines are detected.

Specifically, the CPU 41 detects outline of the graphic by using a Hough transformation (Hough transform) when executing the outline detection program 433 (see, FIGS. 5 and 10).

The Hough transformation is a well-known technique in the art of image processing and is a method for determining equation of a straight line or a curved line from mass of points by performing coordinate conversion.

Accordingly, the detection of outline of the graphic having a straight line portion or a curved line portion can be suitably performed to the graphics included in the image.

The CPU 41 detects an outline of only the graphic of the designated shape from among the graphics included in the corrected image in the case where the user has designated a shape of the graphic to which a measurement of the graphical information is to be performed by an operation through the operation section 30.

The CPU 41 functions as an outline detection section by executing the outline detection program 433.

The setting program 434 is a program for, for example, causing the CPU 41 to realize a function to set the edge detection tool on the outline detected by the execution of the outline detection program 433.

Specifically, the CPU 41 selects a predetermined edge detection tool in accordance with the detected outline and sets the selected edge detection tool on the outline, by executing the setting program 434.

For example, if the detected outline is a straight line, the CPU 41 sets a rectangular box tool T1 (see FIG. 6) as the edge detection tool on the outline of the straight line.

Moreover, for example, if the detected outline is a curved line, the CPU 41 sets an annular shaped circular tool T2 (see, FIG. 11) as the edge detection tool on the outline of the circle.

The CPU 41 functions as a setting section by executing the setting program 434.

The measurement program 435 is a program for, for example, causing the CPU 41 to realize a function to measure the graphical information regarding the graphic by using the edge detection tool set by the execution of the setting program 434.

Specifically, in the case of determining a width of a straight line, the CPU 41 detects a position of the edge by using the box tool T1. Then, the CPU 41 measures a distance from a position at which one edge is detected by one box tool T1 to a position at which another edge is detected by another box tool T1 set to be opposite to the one box tool T1, and determines the width of the straight line (see FIG. 7).

Figure 12:
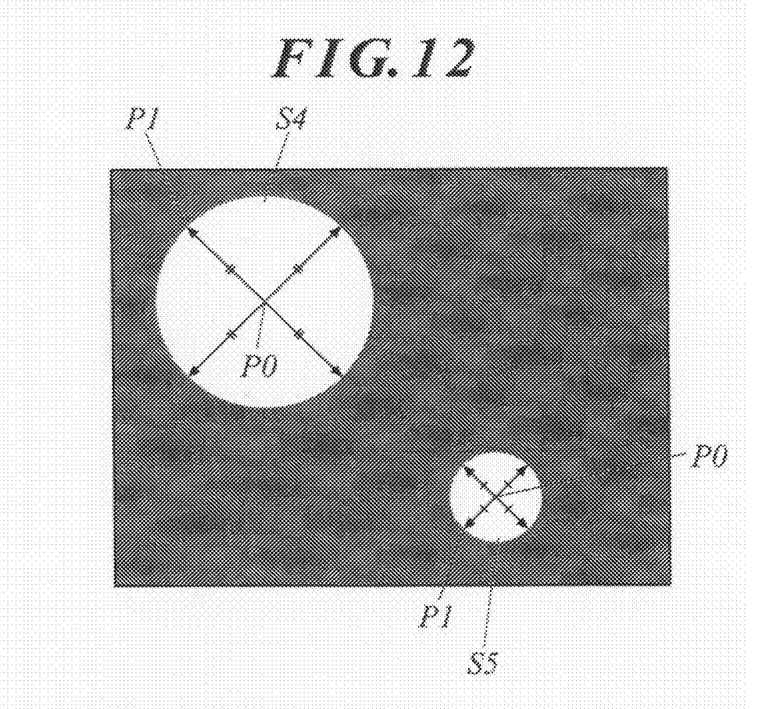
FIG. 12 shows an example showing graphical information of a graphic to which a measurement by the edge detection tool is to be performed.

Moreover, for example, in the case of determining a radius of a circle, the CPU 41 detects a position of the edge by using the circular tool T2 and determines the center or radius of the circle (see FIG. 12).

The CPU 41 functions as a measurement section by executing the measurement program 435.

Here, images displayed on the display section 20 in association with the execution of the above mentioned obtaining program 431, the image quality correction program 432, the outline detection program 433, the setting program 434 or the measurement program 435 will be shown, for example.

FIGS. 3 to 7 show examples of detecting outline from a linear graphic, setting the box tool T1 on the detected outline, and then measuring a line width as the graphical information.

Figure 3:
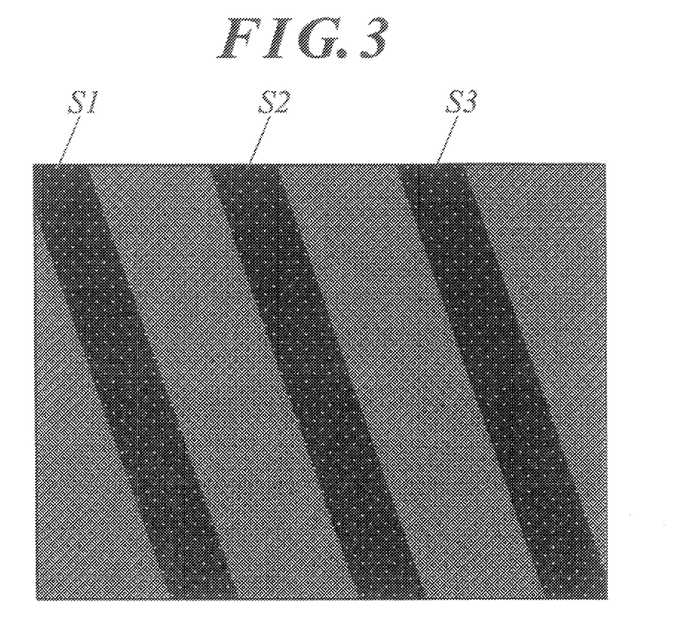
FIG. 3 shows an example of an original image taken into the image measurement apparatus.

FIG. 3 shows an example of an original image including graphics of three linear graphics S1, S2 and S3. In FIG. 3, the linear graphics S1 to S3 constitutes dark sections that are darker in brightness than the other areas.

FIG. 4 shows an example of a corrected image obtained by correcting the image quality of the original image of FIG. 3.

This FIG. 4 is an example in which the binarization processing is performed as an image quality correction. The linear graphics S1 to S3 which are black portions in the binarization are blacker in FIG. 4 than in the original image, and the background which are white portions in the binarization are whiter in FIG. 4 than in the original image. In this way, by executing the image quality correction, the graphics (linear graphics S1 to S3) become distinct against the background, thereby detection of the outline becomes possible.

FIG. 5 shows an example of an image in which outlines of the linear graphics S1 to S3 are detected by the Hough transformation.

In FIG. 5, straight lines L1 to L6 are displayed by way of white lines as the detected outlines of the linear graphics S1 to S3.

Figure 6:
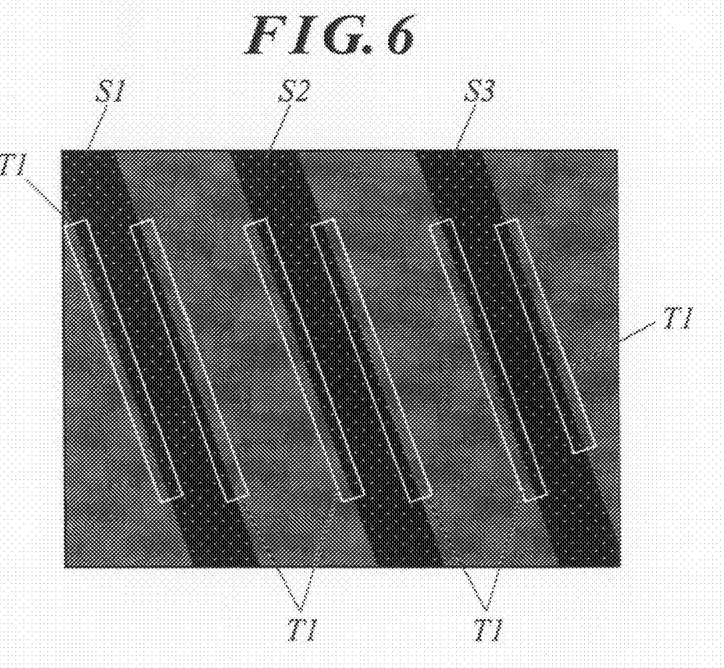
FIG. 6 shows an example of an image in which edge detection tools are set.

FIG. 6 shows an example of an image in which the box tools T1 are set.

In FIG. 6, six box tools T1 corresponding to the straight lines L1 to L6, respectively, are set.

Figure 7:
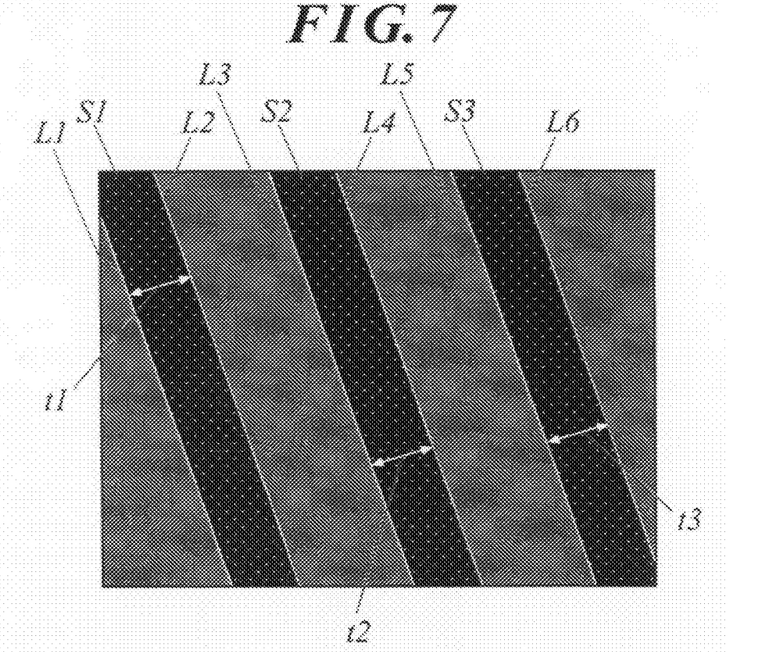
FIG. 7 shows an example showing graphical information of a graphic to which a measurement by the edge detection tool is to be performed.

FIG. 7 shows graphical information (line width) to be measured by the box tool T1.

As shown in FIG. 7, distance t1 between lines L1 and L2, distance t2 between lines L3 and L4, and distance t3 between lines L5 and L6 are measured as line widths of the linear graphics S1 to S3, respectively.

FIGS. 8 to 12 show examples of detecting outlines from circular graphics, setting the circular tools T2 on the detected outlines, respectively, and measuring center or radius of each circle as the graphical information.

Figure 8:
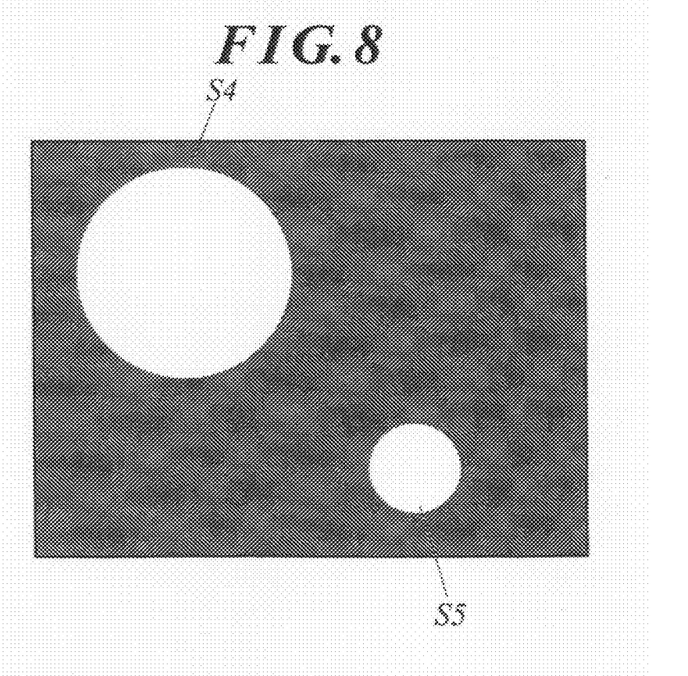
FIG. 8 shows an example of an original image taken into the image measurement apparatus.

FIG. 8 shows an example of an original image including two graphics, namely, a larger circular graphic S4 and a smaller circular graphic S5.

In FIG. 8, the circular graphics S4 and S5 constitutes bright sections that are brighter than the other areas.

FIG. 9 shows an example of a corrected image obtained by correcting the image quality of the original image of FIG. 8.

This FIG. 9 is an example in which the noise removal processing is performed as the image quality correction, for example, thus the noises in the original image are removed. The graphics (circular graphics S4 and S5) in FIG. 9 are distinct against the background relative to the original image.

FIG. 10 shows an example of an image in which outlines of the circular graphics S4 and S5 are detected by using the Hough transformation.

In FIG. 10, circles L7 and L8 are displayed by way of black lines as the detected outlines of the circular graphics S4 and S5.

Figure 11:
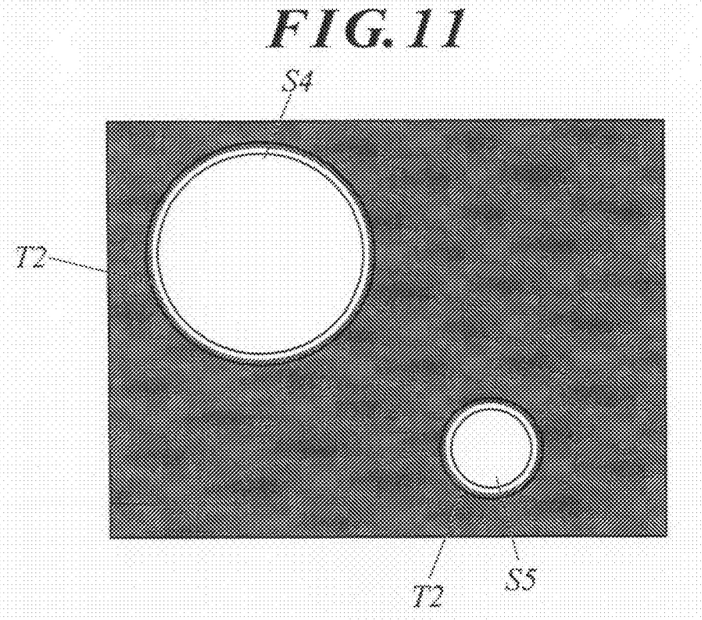
FIG. 11 shows an example of an image in which edge detection tools are set.

FIG. 11 shows an example of an image in which the circular tools T2 are set.

In FIG. 11, the circular tools T2, T2 are set to the circles L7 and L8, respectively.

FIG. 12 shows graphical information to be measured by the circular tools T2, T2.

As shown in FIG. 12, a position at which distances from a plurality of points on the detected edge are the same is measured as a center P0 of the circle.

Moreover, a distance from the center P0 to a point P1 on the edge is measured as a radius of the circle.

Figure 13:
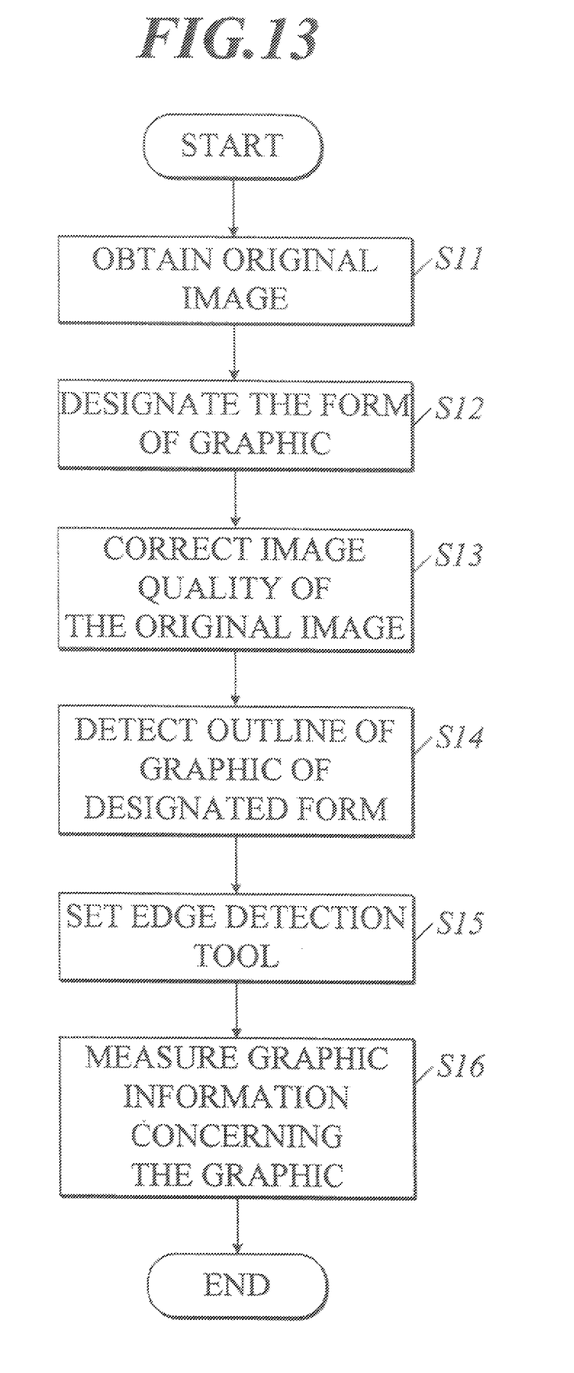
FIG. 13 is a flowchart showing an image measurement process according to an embodiment of the present invention.

Next, the image measurement processing executed by the image measurement apparatus 100 will be described with reference to the flowchart shown in FIG. 13.

First, when the pickup of the work 12 is performed in response to the user's operation to instruct pickup of the work at step S11, the CPU 41 obtains the picked up image of the work 12 into the image data storage section 43a as the original image data (see FIGS. 3 and 8) (obtainment step).

Then, at step S12, the user performs operation to instruct start of the image measurement processing by designating, through the operation section 30, a shape of the graphic from which the graphical information is to be measured.

Then, at step S13, the CPU 41 corrects image quality of the original image data (see FIGS. 4 and 9) (image quality correction step).

Then, at step S14, the CPU 41 detects, by using the Hough transformation, outline of the graphic having the shape designated by the user at the above step S12 from among the graphics existing in the corrected image (see FIGS. 5 and 10) (outline detection step).

Then, at step S15, the CPU 41 sets the edge detection tool T1 or T2 on the detected outline (see FIGS. 6 and 11) (setting step).

Then, at step S16, the CPU 41 measures the graphical information regarding the graphic by using the edge detection tools (see FIGS. 7 and 12) (measurement step), and then ends the processing.

As described above, according to the embodiment of the present invention, when the original image data of the work 12 taken by the imager unit 17 is obtained, the outline of the graphic included in the original image corresponding to the obtained original image data is detected by using the Hough transformation, the edge detection tool is set on the detected outline, and the measurement of the graphical information regarding the graphic is performed by the set edge detection tool.

That is, the edge detection tool is automatically set in response to the obtainment of the image, and then the measurement of the graphical information is performed.

Therefore, there is no need for the user to manually set the edge detection tool T.

Moreover, in the case of continuously measuring the graphical information of the graphics that are equally spaced and regularly arranged, there is no need for the user to set the displacement amount of the edge detection tool T and to set the number of measurements to be performed.

Moreover, because the outline of the graphic is detected by the Hough transformation, it becomes possible to realize a swift measurement by adopting the Hough transformation which is common in the art of image processing to the processing at the image measurement apparatus.

Accordingly, it is possible to perform the measurement swiftly and certainly without troubling the user.

Moreover, according to the embodiment of the present invention, the image measurement apparatus 100 includes the operation section 30 to designate a shape of a graphic to which the user is going to perform a measurement of the graphic information. Then, outline of the graphic that has the shape designated through the operation section 30 is detected from among the graphics included in the obtained image.

Therefore, it is possible to perform the measurement only to the graphic to which the user intends to perform the measurement, even in the case where graphics in which plural kinds of shapes are mixed are included in the original image.

In the above embodiment, the configuration in which the outline of the graphic included in the image is detected after the image quality of the original image is corrected is explained as an example. However, the image quality correction processing is performed arbitrarily according to a condition of the original image, thus is not necessarily performed.

Moreover, in the above embodiment, the configuration in which the measurement of the graphical information regarding the graphic designated through the operation section 30 is performed is explained as an example. However, the designation of the graphic is not necessarily performed.

In this case, the edge detection tools are set to all graphics included in the original image.

The entire disclosure of Japanese Patent Application No. 2011-175755 filed on Aug. 11, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image measurement apparatus, comprising:
    an imager that takes an image of a subject to be measured;
    an obtainer that obtains the image of the subject taken by the imager;
    a designator that designates at least one form of a graphic;
    an outline detector that detects, from at least one graphic included in the image obtained by the obtainer, by a Hough transformation, at least one outline of at least one graphic that has a substantially same form as the at least one form designated by the designator;
    a setter that selects at least one edge detection tool in accordance with the at least one outline detected by the outline detector without user intervention, and sets the selected at least one edge detection tool on the at least one outline detected by the outline detector; and
    a measurer that measures, by the at least one edge detection tool set by the setter, graphic information concerning the graphic,
    wherein, when the at least one form includes a plurality of different forms, the outline detector sequentially detects outlines of graphics that have substantially same forms as the plurality of different forms, and the setter sequentially selects edge detection tools for the outlines of graphics without user intervention between two succeeding selections of edge detection tools, and
    wherein the imager, obtainer, designator, outline detector, setter and measurer comprise a processor that executes instructions stored in a memory.

2. A method of measuring an image, comprising:
obtaining an image of a subject to be measured taken by an imager;
designating at least one form of a graphic;
detecting, from at least one graphic included in the obtained image, by a Hough transformation, at least one outline of at least one graphic that has a substantially same form as the designated at least one form;
selecting at least one edge detection tool in accordance with the detected at least one outline;
setting the selected at least one edge detection tool on the detected at least one outline without user intervention; and
measuring, by the set at least one edge detection tool, graphic information concerning the graphic,
wherein, when the at least one form includes a plurality of different forms, the detecting sequentially detects outlines of graphics that have substantially same forms as the plurality of different forms, and the setting sequentially selects edge detection tools for the outlines of graphics without user intervention between two succeeding selections of edge detection tools.

3. The image measurement apparatus according to claim 1, wherein the form comprises a straight line and an arc.

4. The image measurement apparatus according to claim 1, wherein the edge detection tool comprises a rectangular box tool and an annular shaped circular tool.

5. The method according to claim 2, wherein the form comprises a straight line and an arc.

6. The method according to claim 2, wherein the edge detection tool comprises a rectangular box tool and an annular shaped circular tool.

7. The image measurement apparatus according to claim 1, wherein when the outline detector detects two lines, the setter sets rectangular box tools for the two lines, respectively, and the measurer measures the width between two lines by using the rectangular box tools.

8. The image measurement apparatus according to claim 1, wherein the designator accepts an input by a user, the input designating the at least one form of the graphic.

9. The method according to claim 2, wherein the designating comprises accepting an input by a user, the input designating the at least one form of the graphic.

10. The image measurement apparatus according to claim 1, wherein there is no user intervention after the outline detector detects the at least one outline of at least one graphic and before the setter selects at least one edge detection tool.

11. The method according to claim 2, wherein there is no user intervention after the detection of the at least one outline of at least one graphic and before the selection of at least one edge detection tool.

* * * * *